United States Patent
Santry

(10) Patent No.: US 9,411,533 B2
(45) Date of Patent: Aug. 9, 2016

(54) SNAPSHOTS AND VERSIONING OF TRANSACTIONAL STORAGE CLASS MEMORY

(71) Applicant: NetApp, Inc., Sunnyvale, CA (US)

(72) Inventor: Douglas Joseph Santry, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 382 days.

(21) Appl. No.: 13/901,145

(22) Filed: May 23, 2013

(65) Prior Publication Data

US 2014/0351535 A1 Nov. 27, 2014

(51) Int. Cl.
*G06F 12/00* (2006.01)
*G06F 3/06* (2006.01)
*G06F 11/14* (2006.01)

(52) U.S. Cl.
CPC .............. *G06F 3/065* (2013.01); *G06F 3/0614* (2013.01); *G06F 3/0683* (2013.01); *G06F 11/1456* (2013.01)

(58) Field of Classification Search
CPC ...... G06F 3/065; G06F 3/0614; G06F 3/0683
See application file for complete search history.

(56) References Cited

U.S. PATENT DOCUMENTS

| | | | |
|---|---|---|---|
| 7,908,255 | B2 | 3/2011 | Detlefs et al. |
| 8,375,062 | B2 | 2/2013 | Herlihy et al. |
| 2008/0250074 | A1* | 10/2008 | Parkinson ...................... 707/200 |
| 2008/0256073 | A1* | 10/2008 | Detlefs et al. ...................... 707/8 |
| 2010/0241614 | A1* | 9/2010 | Shaull et al. .................. 707/649 |

OTHER PUBLICATIONS

W. Pugh, Skip Lists: A Probabilistic Alternative to Balance Trees, Communications of the ACM, vol. 33 Issue 6, pp. 668-676, Jun. 1990 (8 Pages).
W. Pugh, A Skip List Cookbook, Univ. Maryland, Technical Report CS-TR-2286.1, Jul. 1989 (13 Pages).
M. Herlihy et al., Transactional Memory: Architectural Support for Lock-Free Data Structures, Proceeding ISCA '93 Proceedings of the 20th annual international symposium on computer architecture pp. 289-300, 1993 (12 Pages).

(Continued)

*Primary Examiner* — Brian Peugh
(74) *Attorney, Agent, or Firm* — Cesari and McKenna, LLP

(57) ABSTRACT

A system and method enables efficient implementation of snapshots of data organized as arbitrary data structures on a byte-addressable persistent memory of a host computer. A user-level library of the host computer may configure the persistent memory as a software transactional memory (STM) system defined by operations, such as a STM commit operation, that ensure safe and consistent storage of the data (i.e., the data structures) within a region of the persistent memory. The library may then cooperate with an application executing on the host computer to control access to a data structure, e.g., to change a datum, stored in the region of the persistent memory as a transaction using the STM commit operation. Within a context of the transaction, the library may precisely determine which byte or bytes of the datum have changed within the region, as well as how and when the bytes have changed. Armed with precise knowledge of the context of the transaction, the library may efficiently implement a snapshot (i.e., point-in-time copy) of the changed datum and its associated data structure at the granularity at which it was modified, e.g., at the byte-addressable granularity.

20 Claims, 8 Drawing Sheets

(56) References Cited

OTHER PUBLICATIONS

M. Moir, Transparent Support for Wait-free Transactions, Proceeding WDAG '97 Proceedings of the 11th International Workshop on Distributed Algorithms, pp. 305-319, 1997 (15 Pages).

W. Pugh, Concurrent Maintenance of Skip Lists, Univ. Maryland, Technical Report CS-TR-2222, Jun. 1990 (14 Pages).

T. Harris, A Pragmatic Implementation of Non-Blocking Linked-Lists, Proceeding DISC '01 Proceedings of the 15th International Conference on Distributed Computing, pp. 300-314, 2001 (15 Pages).

T. Harris et al., Language Support for Lightweight Transactions, OOPSLA '03 Proceedings of the 18th annual ACM SIGPLAN conference on Object-oriented programing, systems, languages, and applications, pp. 388-402, 2003 (15 Pages).

M. Herlihy et al., Software Transactional Memory for Dynamic-Sized Data Structures, PODC '03 Proceedings of the twenty-second annual symposium on Principles of Distributed Computing, pp. 92-101 (10 Pages).

T. Harris, Design Choices for language-based transactions, Univ. of Cambridge, Computer Lab Technical Report 572, Aug. 2003 (7 pages).

K. Fraser, Practical Lock-freedom, Univ. of Cambridge, Computer Lab Technical Report 579, Feb. 2004 (116 Pages).

K. Fraser et al., Concurrent Programming Without Locks, ACM Transactions on Computer Systems (TOCS), vol. 25 Issue 2, Article No. 5, May 2007 (61 Pages).

J. Guerra et al., Software Persistent Memory, Proceeding USENIX ATC'12 Proceedings of the 2012 USENIX conference on Annual Technical Conference, 2012 (13 Pages).

Harris et al., *Transactional Memory*, 2010, Chapters 2 and 4, 104 pages.

Riegel, et al. Snapshot isolation for software transactional memory, *TRANsACT06* 298 (2006), 10 pages.

Wang et al. "*Code generation and optimization for transactional memory constructs in an unmanaged language.*" Proceedings of the International Symposium on Code Generation and Optimization. IEEE Computer Society, 2007, 12 pages.

\* cited by examiner

SNAPSHOTS AND VERSIONING OF TRANSACTIONAL STORAGE CLASS MEMORY

BACKGROUND

1. Technical Field

The present disclosure relates to snapshots and, more specifically, to efficient implementation of a snapshot for a datum on a byte-addressable persistent memory of a host computer.

2. Background Information

The advent of byte-addressable persistent memory, such as storage class memory, may accelerate adoption of primary storage to reside on a memory bus of a host computer, as well as acceptance of "in-memory" computing. The persistent memory may be configured to enable applications executing on the host computer to safely and consistently modify (change) their data and associated data structures at a byte addressable granularity. Yet, even safe and consistent data stored in the persistent memory may be vulnerable, e.g., in the event of a data loss, because there is only a single copy of the data and associated data structures on the host computer.

A snapshot is a data management feature that offers a consistent, read-only copy or representation of data at a previous time and, as such, is useful for experimentation, archiving and data recovery. Typically, the data is organized as a logical construct, such as a file or database, and a copy of the file or database is taken to create the snapshot. However, it may be desirable to provide a capability for implementing a snapshot of an individual datum, e.g., on a per data structure basis, stored on a byte-addressable persistent memory of a host computer.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
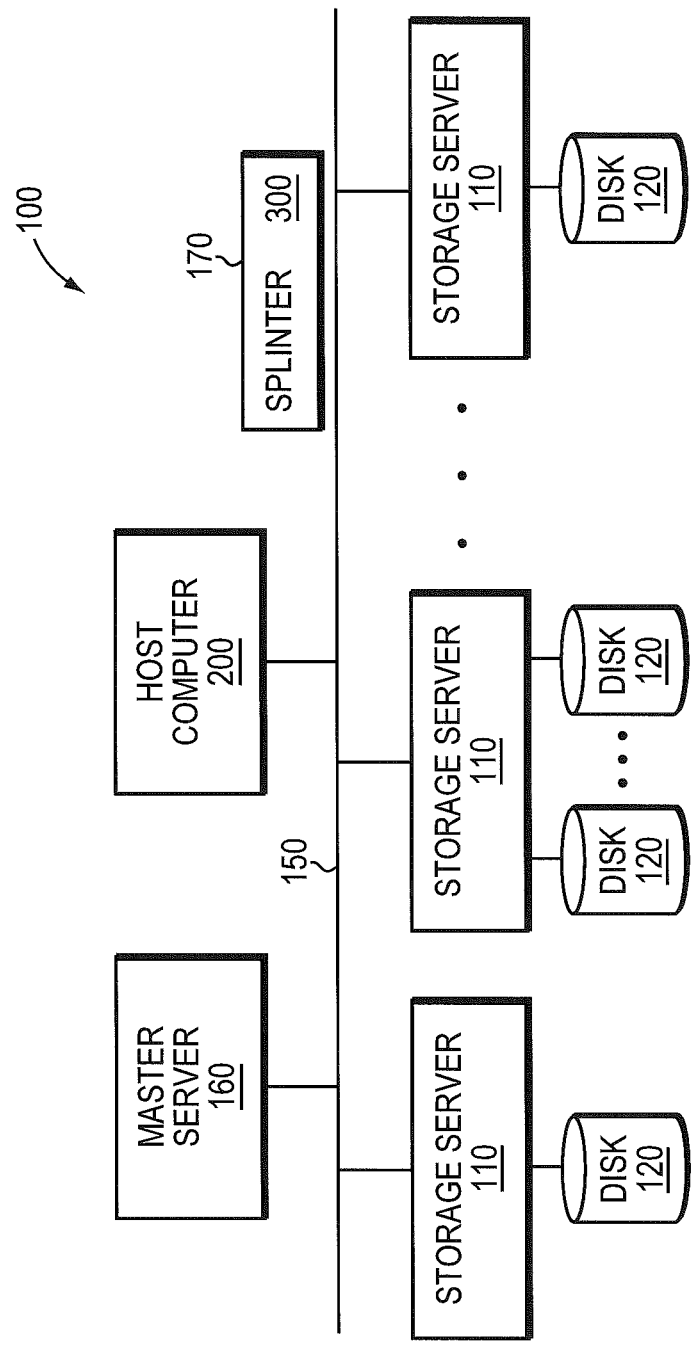
FIG. 1 is a block diagram of a network environment.

The embodiments described herein provide a system and method for efficiently implementing snapshots of data organized as arbitrary data structures on a byte-addressable persistent memory of a host computer. A user-level library of the host computer may configure the persistent memory as a software transactional memory (STM) system defined by operations, such as a STM commit operation, that ensure safe and consistent storage of the data (i.e., the arbitrary data structures) within a region of the persistent memory. The library may then cooperate with an application executing on the host computer to control access to a data structure, e.g., to change a datum, stored in the region of the persistent memory as a transaction using the STM commit operation. Within a context of the transaction, the library may precisely determine which byte or bytes of the datum have changed within the region, as well as how and when the bytes have changed. Armed with precise knowledge of the context of the transaction, the library may efficiently implement a snapshot (i.e., a copy) of the changed datum and its associated data structure at the granularity at which it was modified, e.g., at the byte-addressable granularity.

In one or more embodiments, the transaction may be embodied as a transaction descriptor containing a read/write (r/w) set of the data to be changed, as well as a state of the transaction. Each datum within the r/w set inherits a guard data structure ("guard") configured to protect the datum. Illustratively, the guard contains the datum, a version number and a pointer to a transaction ticket. The transaction ticket, in turn, contains a pointer to the transaction descriptor and a pointer to the datum's entry within the r/w set of the transaction descriptor. A level of indirection is introduced to the transaction through a handle structure ("handle") interposed between the application and guard. To that end, the handle contains a pointer to the guard (and to the datum). The interposed indirection provided by the handle enables manipulation, i.e., movement and copying, of the datum by the user-level library without involvement of the application, while still allowing the application to access the datum (i.e., via the handle).

In an embodiment, a snapshot of the datum may be created in response to creation of a snapshot of the region (i.e., the region snapshot) containing the datum. Illustratively, creation of the region snapshot includes incrementing a version number of the region. Upon changing the datum following creation of the region snapshot, the version number of the guard may not match the incremented version number of the region. The user-level library may observe the mismatch, e.g., within the context of the STM commit operation and, in response, create a new instance of the guard using, e.g., a copy-on-write operation. The new instance of the guard includes the incremented (new) version number, e.g., from the region snapshot, and the changed datum. The library then updates the handle pointer to reference the new instance of the guard as well as its changed datum and new version number. Notably, the previous (old) version of the datum and its old version number are retained within a set of historical values for the datum organized as a per datum skip list of the guard (i.e., keyed by version number). Accordingly, the guard provides a basis for versioning of the datum.

DESCRIPTION

System

FIG. 1 is a block diagram of a network environment 100 that may be advantageously used with one or more embodiments described herein. The environment 100 may include a host computer 200 coupled to a plurality (e.g., a cluster) of storage servers 110 over a computer network 150. The computer network 150 may include one or more point-to-point links, wireless links, a shared local area network, a wide area network or a virtual private network implemented over a public network, such as the well-known Internet, although, in an embodiment, the computer network 150 is illustratively an Ethernet network. The environment 100 may also include a master server 160 configured to manage the cluster of storage servers 110. The master server 160 may be located anywhere on the network 150, such as on host computer 200 or on a storage server 110; however, in an embodiment, the master server 160 is illustratively located on a separate administrative computer.

Each storage server 110 may be embodied as a computer, such as a storage system, storage appliance such as a filer, or a blade running a user level process, configured to provide storage services to the host computer 200. As such, each storage server 110 includes computing and memory elements coupled to one or more storage devices, such as disks 120. The host computer 200 may communicate with the storage servers 110 using discrete messages or splinters 300 contained within frames 170, such as Ethernet frames, that are transmitted over the network 150 using a variety of communication protocols including, inter alia, wireless protocols and/or Ethernet protocols. However, in an embodiment described herein, the frame 170 is illustratively encapsulated within a User Datagram Protocol/Internet Protocol (UDP/IP) messaging protocol.

Figure 2:
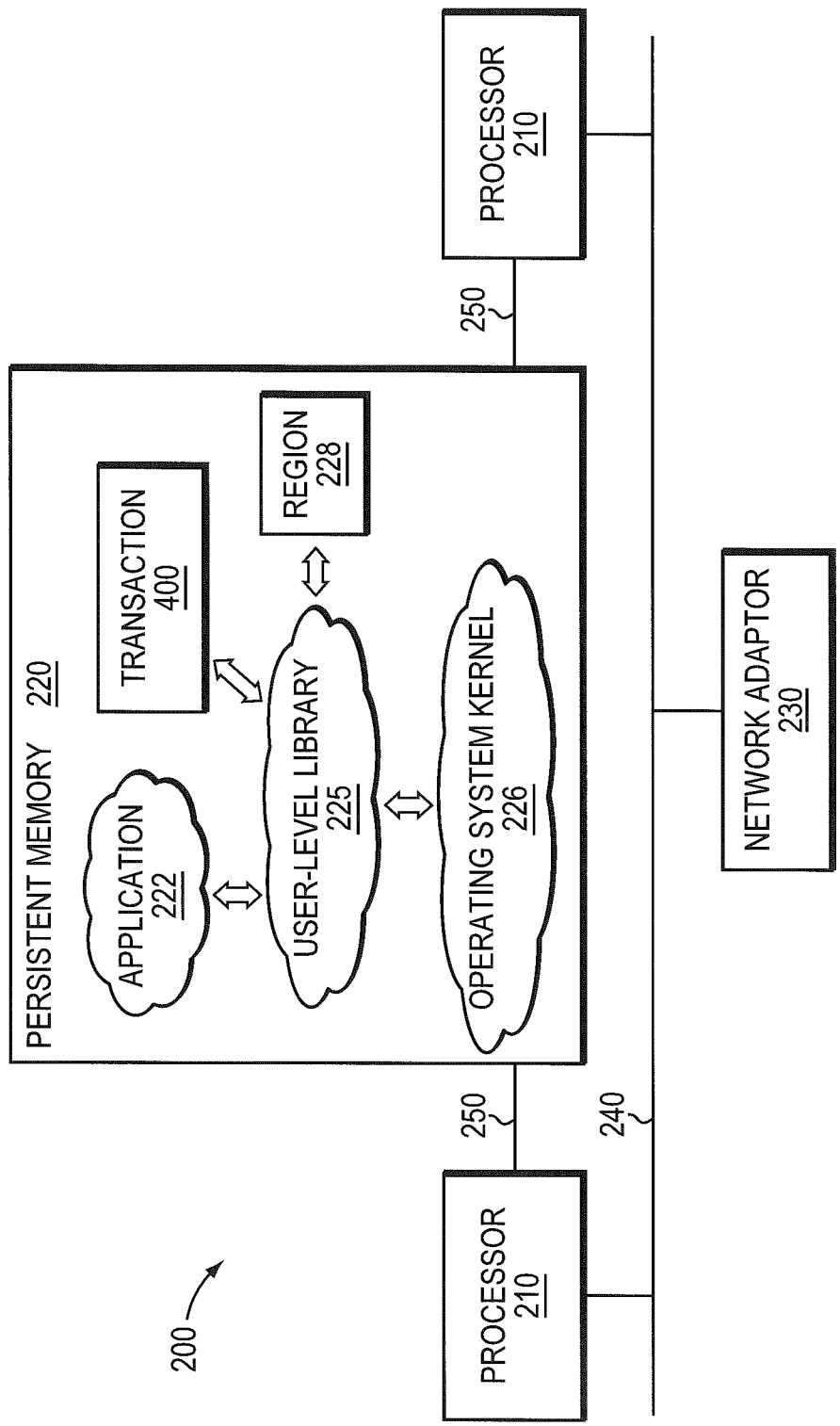
FIG. 2 is a block diagram of a host computer of the network environment.

FIG. 2 is a block diagram of host computer 200 that may be advantageously used with one or more embodiments described herein. The host computer 200 illustratively includes one or more processors 210 interconnected to a network adapter 230 by a bus 240, such as a system bus. Bus 240 may also interconnect a persistent memory 220 and input/output devices (not shown), such as the network adaptor 230. Illustratively, each processor 210 may be connected to the persistent memory 220 via a bus 250, such as an individual memory bus or a shared memory bus. The network adapter 230 may include the mechanical, electrical and signaling circuitry needed to connect the host computer 200 to the storage servers 110 over computer network 150. The network adapter 230 may also include logic circuitry configured to generate frames 170 containing the splinters 300 and transmit the frames over the network 150 in accordance with one or more operational modes that replicate information contained in the splinters on the disks 120 of the storage servers 110.

The persistent memory 220 may illustratively be embodied as non-volatile memory, such as storage class memory, having characteristics that include, e.g., byte addressability of data organized as logical constructs, such as a file or region 228, in the memory. The byte addressable, persistent memory 220 may include memory locations that are addressable by the processor 210 for storing software programs and data structures associated with the embodiments described herein. The processor 210 may, in turn, include processing elements and/or logic circuitry configured to execute the software programs, such as user-level library 225, and manipulate the data structures, such as transaction 400. An operating system kernel 226, portions of which are typically resident in persistent memory 220 and executed by the processing elements, functionally organizes the host computer by, inter alia, invoking operations in support of one or more applications 222 executing on the computer. Illustratively, the application 222 may be implemented via a process that includes a plurality of threads. It will be apparent to those skilled in the art that other processing and memory means, including various computer readable media, may be used to store and execute program instructions pertaining to the embodiments herein.

As used herein, the region 228 may be a logically contiguous address space that is backed physically with the persistent memory 220. The region 228 may be mapped into an address space of the application (i.e., process) to enable modification, e.g., writing, of the region 228 by the application. Once the region is mapped into the application's address space, the user-level library 225 may control access to the region. That is, the application 222 may read and/or write data organized as arbitrary data structures and stored in the region of the locally attached persistent memory through the user-level library 225. As a result, the user-level library 225 may operate as a control point for accessing the persistent memory 220, thereby circumventing the operating system kernel 226.

User-Level Library

In an embodiment, the user-level library 225 may configure the persistent memory 220 as a software transactional memory (STM) system defined by operations, such as a STM commit operation, that ensure safe and consistent storage of data (i.e., the data structures) in the region 228 of the persistent memory 220. To that end, the user-level library 225 contains computer executable instructions executed by the processor 210 to perform operations that that modify the persistent memory 220 to provide, e.g., atomicity, consistency, isolation and durability (ACID) semantics or properties. The ACID properties of the STM system are illustratively implemented in the context of transactions, such as transaction 400, which atomically move the data structures (and their associated data) stored in the memory from one correct state to another. The STM system thus enables the application 222 to modify its data of a region 228 in a manner such that the data moves atomically from one safe consistent state to another consistent state (i.e., states with ACID properties) in the persistent memory 220.

Illustratively, the library 225 may cooperate with application 222 to control access to a data structure, e.g., to change a datum, stored in the region of the persistent memory 220 as transaction 400 using the STM commit operation. In an embodiment, the application (i.e., thread) may initiate the transaction 400 by assembling all elements (data) that it intends to write; this is referred to as a read/write (r/w) set of the transaction. For example, assume that the transaction 400 involves inserting a new node into a doubly-linked list within region 228. In accordance with the byte addressability property of the persistent memory 200, the application may render small, random modifications or changes to the data and data structures; to that end, the entries of the r/w set that the application intends to write (change) may include a previous pointer, a next pointer, and the new node. The application 222 may then cooperate with the user-level library 225 to execute the transaction in accordance with the STM commit operation. Successful execution of the commit operation (and the transaction) results in changing every entry (datum and its associated data structure) of the write set simultaneously and atomically, thus ensuring that the contents of the persistent memory are safe and consistent. Notably, within the context of the transaction 400, the library 225 may precisely determine which byte or bytes of the datum have changed within the region 228, as well as how and when the bytes have changed. Armed with precise knowledge of the context of the transaction, the library 225 may efficiently implement a snapshot (i.e., copy) of the changed datum and its associated data structure at the granularity at which it was modified, e.g., at the byte-addressable granularity.

Figure 3A:
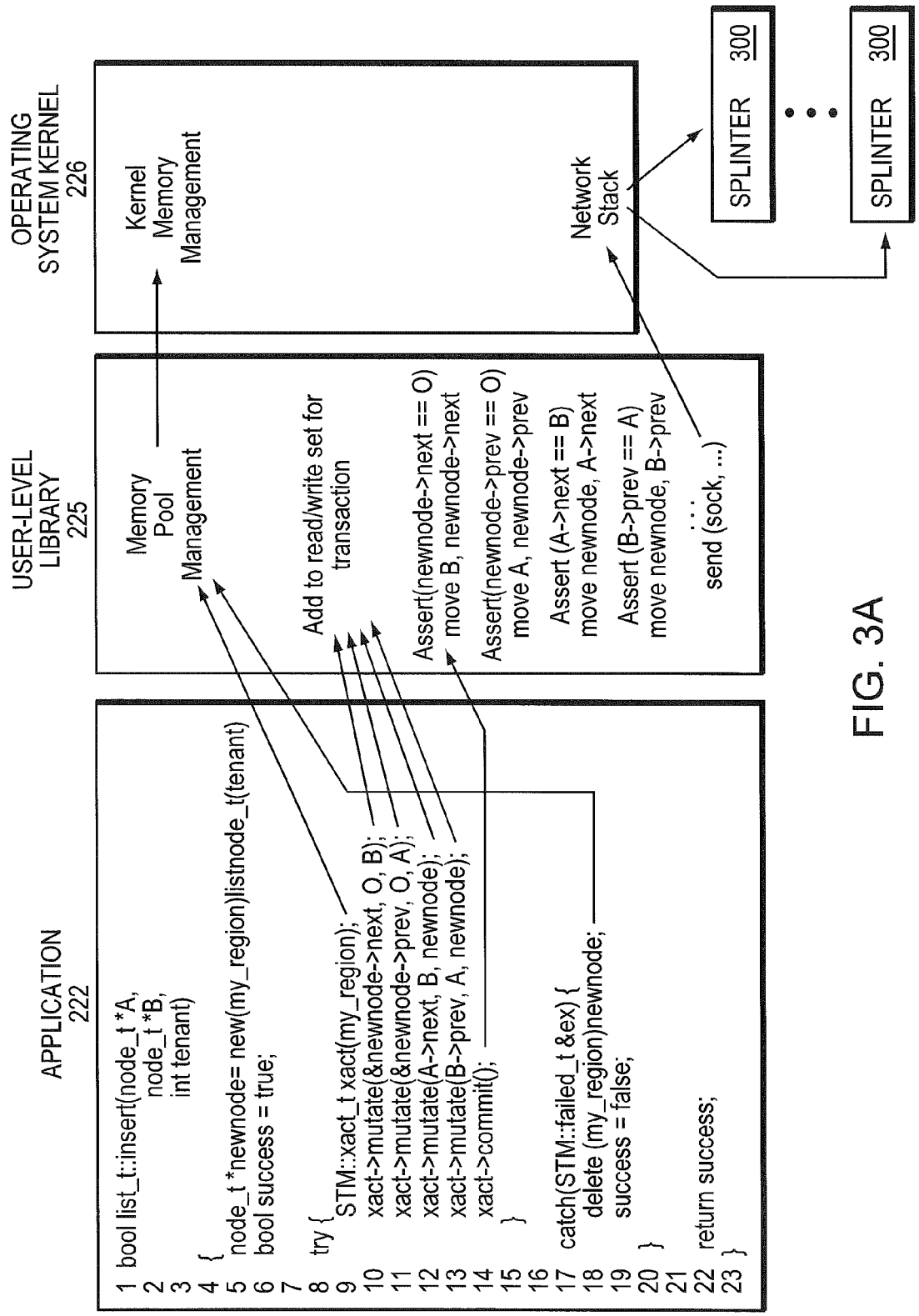
FIG. 3a is a source code illustration of application code for software transactional memory.

FIG. 3a illustrates the above-mentioned sample application for node insertion. A source code listing in C++ is shown for inserting a new node, e.g. having a value "tenant," into a doubly-linked list. Further shown in cooperation with the source code are corresponding illustrative operations in the user-level library 225 (e.g., a C++ library) and the operating system kernel 226. Illustratively, a boolean function, "insert" (line 1), places a new node between existing nodes, "A" and "B" (lines 1-2), in the doubly-linked list. Initially, the new node, e.g., "newnode" (including the value in variable "tenant," line 5), may be created (i.e., allocated) in region 228, e.g., identified as "my_region," which may involve cooperation with memory pool management in the user-level library 225 and kernel memory management in the operating system kernel 226. The transaction 400 may then be created as an object, e.g., "xact" (line 9), upon which one or more of operations are accumulated (i.e., added to the transaction, "xact" in lines 10-13) with respect to an associated datum (i.e., the pointers "prev" and "next" in the "node_t" data structure) within the region 228 (i.e., "my_region"). Performance of the actual node insertion (i.e., update of the associated datum within the region, "my_region") may occur when the transaction is committed. Illustratively such operations may include read, write or mutate (i.e., migrate the datum from one value to another). Notably, each entry in the r/w set may operate on a different datum, e.g., "mutate(&newnode→next, . . . )" (line 10) and "mutate(&newnode→prev, . . . " (line 11). In an embodiment, the "mutate" instruction may also include a logical assertion, such as a prior value of the datum, before it is changed. Additionally, the "mutate" operation may be implemented as an inline function which adds to, e.g., a lock-free queue insert to, the r/w set for the referenced transaction. Further, the user-level library 225 may also be implemented to overload the reserved C++ operator "new" so as to allocate the datum (i.e., "newnode") according to its data structure (i.e., "node_t") from a region (i.e., "my_region").

A subsequent STM commit operation for the transaction, e.g. "xact→commit( )" (line 14), may apply every change in the r/w set, i.e., write set, of the transaction to the respective datum (and its associated data structure) simultaneously and atomically as seen by the application. That is the STM commit operation applies the changes in the r/w set (i.e., all entries in the write set) of the transaction so that each datum is changed according the associated operation. Illustratively, the result is that either all r/w set operations are "committed" (i.e., an ACID state where all operations have been applied) or all r/w set operations are "aborted" (i.e., an ACID state where all operations are not applied). Accordingly, a state of the transaction progresses from an initial state, illustratively "undecided," during execution of the STM commit operation, to a terminal state of either "committed" or "aborted" after completion. In an embodiment, the order of applying the write set for a given transaction may proceed in the same order that the entries of the r/w set were added, i.e., in a sequential temporal order. However, in an alternate embodiment, the entries of the r/w set may be applied out of order (i.e., simultaneously in parallel executing threads). In this case, the prior value of the datum may be verified (i.e., logical assertion of the prior value, lines 10-13) so as to gate the changing of the datum to ensure against an expected result. In a further embodiment, the r/w set may simply be applied out of order, in which case multiple changes to the same datum within the transaction may be deemed to yield either unexpected results (i.e., the application only expects consistency for the transaction as a whole) or a failure (i.e., the application expects an order applied for the operations in the r/w set of the transaction).

Illustratively, the user-level library 225 may also implement error semantics, e.g., "try/catch" exception handling (lines 8, 17-19), for one or more types of operations, e.g., "new" or "mutate." Notably, this may include the STM commit operation, which may be deemed to fail from an "assert," (e.g., a logical assertion as described above), a timeout, or some other condition.

Figure 3B:
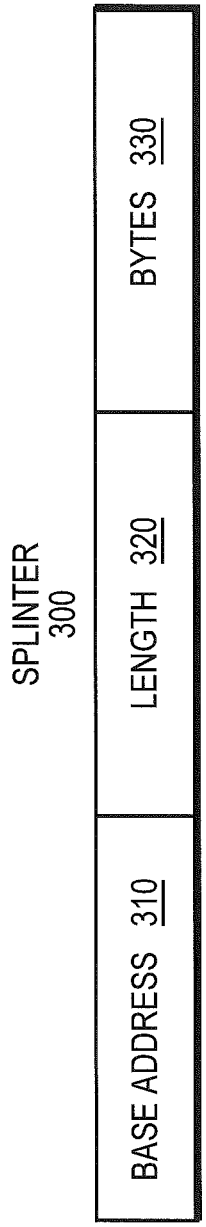
FIG. 3b is a block diagram of a splinter.
Figure 3C:
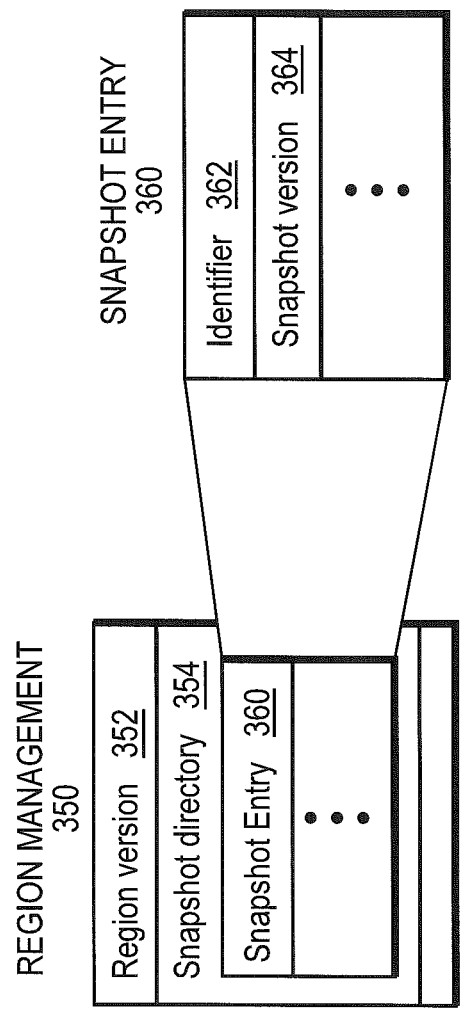
FIG. 3c is a block diagram of a region management data structure and a snapshot directory entry data structure.

FIG. 3b. is a block diagram of a splinter 300 that may be advantageously used with one or more embodiments described herein. Illustratively, splinter 300 may contain information such as a starting or base memory address 310 of the changed data within the region, a length 320 of the changed data and a string of bytes 330 of the changed data. FIG. 3c is a block diagram of a region management data structure 350 and a snapshot directory entry data structure 360. The region management data structure 350 may include information such as a region version number 352 (e.g., a monotonically increasing integer value) associated with a current active version of the region 228 and a snapshot directory 354 having a plurality of snapshot entries 360. Each snapshot directory entry 360 may contain information such as an identifier 362 (e.g., a name within a snapshot namespace, a label, a key or a pointer) of a snapshot of the region and a snapshot version number 364 associated with the snapshot. Alternatively, any data structure capable of storing and retrieving snapshot meta-data (i.e., the snapshot identifier 362 and snapshot version 364) may be used, such as a skip-list, a linked-list, a balanced tree, or a database. In a further alternative, the snapshot may be identified by its version number.

STM Transaction

Figure 4:
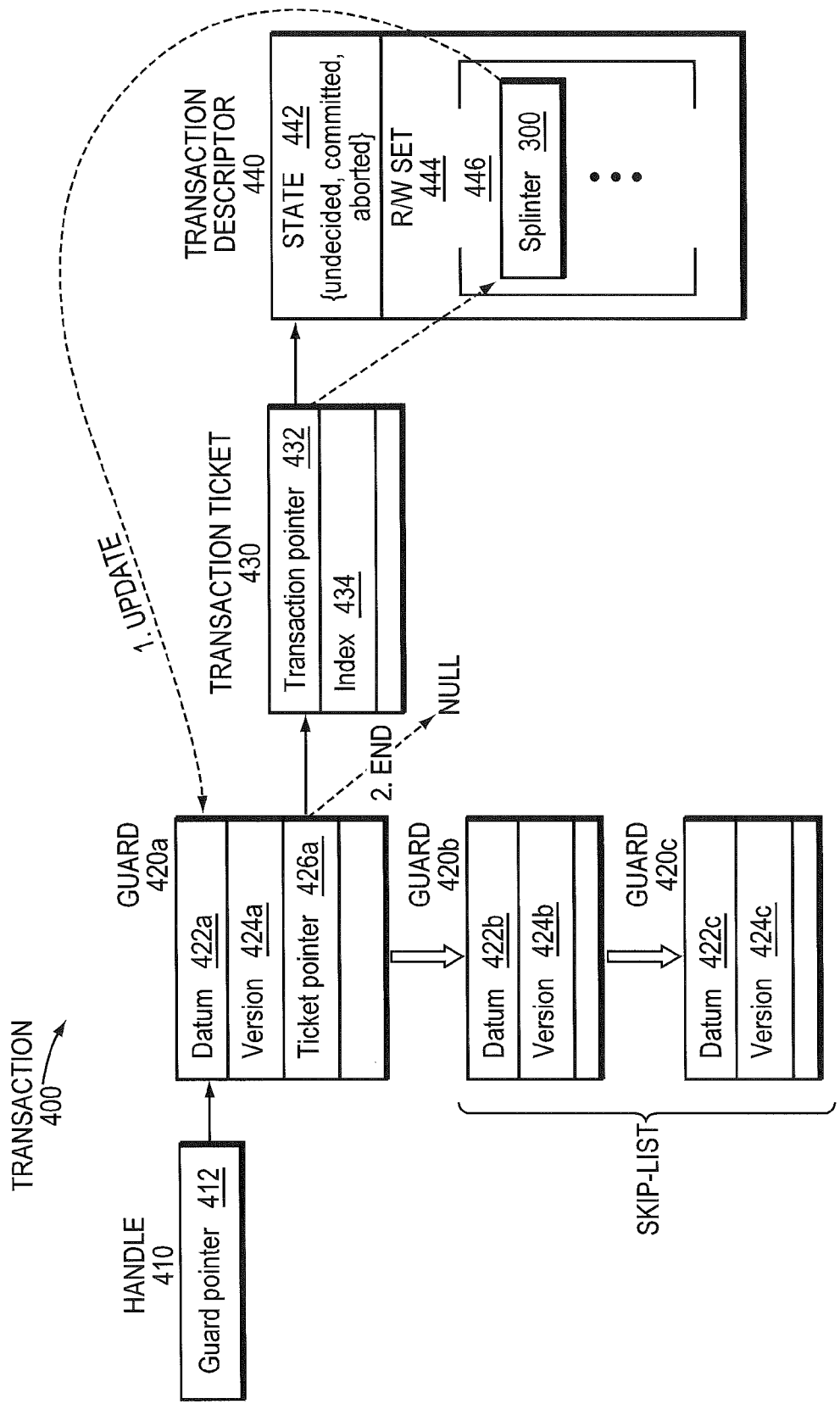
FIG. 4 is a block diagram of a datum transaction update.

FIG. 4. is block diagram of a transaction update. In one or more embodiments, the transaction 400 may be embodied as a transaction descriptor 440 containing a read/write (r/w) set 444 of the data to be changed (e.g., a splinter 300 as an entry 446 associated with an operation in the r/w set 444) as well as a state 442 of the transaction (e.g., "undecided," "committed" or "aborted"). Each datum referenced within the r/w set 444 (i.e., the datum associated with the entry 446 in the r/w set) inherits a guard data structure 420a-c ("guard") configured to protect the respective datum 422a-c. Illustratively, the guard 420 contains the datum 422, a version number 424 and a ticket pointer 426 to a transaction ticket 430 (when the datum 422 is in a current transaction). The version number 424 is initialized with the value from the region version 352. The transaction ticket 430, in turn, contains a pointer 432 to the transaction descriptor 440 and a pointer, illustratively an index 434, to the datum's entry 446 within the r/w set 444 of the transaction descriptor 440. Notably, the STM mutate operation may attach the transaction ticket 430, i.e., loads the ticket pointer 426 with a reference to the transaction descriptor 440, and the STM commit operation may remove the transaction ticket 430, i.e., loads the ticket pointer 426 with a NULL pointer. Accordingly, when a mutate operation, i.e., attempts to assign a transaction, finds the ticket pointer 426 is not NULL, the transaction is aborted, because the datum 422 is already claimed by another transaction.

A level of indirection is introduced to the datum through a handle structure 410 ("handle") interposed between the application 222 and guard 420a. To that end, the handle 410 contains a pointer 412 to the guard 420 (and hence to the datum). The interposed indirection provided by the handle 410 enables manipulation, i.e., movement and copying, of the datum 422a by the user-level library 225 without involvement of the application 222, while still allowing the application to access the datum.

Illustratively, the STM commit operation processes the r/w set 444 operations by applying (i.e., updating for each operation in the write set), the changes (i.e., splinter 300) associated for a respective entry 446 within the r/w set. Once the STM commit has completed all the operations for the r/w set 444, i.e., the transaction is in an ACID state, the ticket pointer 426 is then updated to the NULL pointer. Accordingly, the application 222 may access the datum via the handle 410 by first examining the ticket pointer 426. If the pointer 426 is the NULL pointer, the datum value may be safely retrieved from the datum 422a (i.e., the datum is ACID stable), otherwise the transaction state 442 of the transaction 440 is examined; the datum is said to be claimed by the transaction. When the transaction state 442 is "committed" (i.e., the transaction is ACID stable, but not completed), the datum value may be safely retrieved using the index 434 to reference the datum from the associated entry 446 in the r/w set 444. When the transaction state 442 is "undecided" or "aborted," the datum value also may be safely retrieved from the datum 422*a*. Notably, if the application 222 attempts to write a datum claimed by (i.e., associated with) the transaction 440 in the "undecided" state, the transaction 440 is aborted (i.e., the transaction state 442 transitions from "undecided" to "aborted"). Yet the datum may be referenced in a plurality of read sets simultaneously and merely read by the application 222 without causing any transaction 440 associated with the datum to abort. Illustratively, any other permutation, i.e., combination of ticket pointer 426 (NULL or not), transaction state 442, and application 222 access type (read or write), causes the associated transaction 440 to abort. As a result, simultaneous transactions all have disjoint write sets, but a union of all read sets may be non-null (read-sharing), which ensures correctness and consistency for parallel processing of those r/w sets. In alternative embodiments, a ticket lock algorithm, e.g. using the transaction ticket 430, may be used for parallel processing of the transaction r/w sets 444.

Transactions in the final state, i.e., "committed" or "aborted," may have their associated transaction descriptors and tickets recycled. Notably, transactions suitable for recycling should be free of references to their associated transaction descriptors and tickets. In an embodiment, a garbage collector (not shown) safely manages the life cycle of the descriptors 440 and tickets 430 by maintaining them until all references to them have vanished, e.g., when all the threads referencing the associated transactions 400 terminate. Accordingly, the garbage collector ensures that no thread has a pointer to a finished, i.e., final state, transaction or ticket before recycling it.

Snapshot

In an embodiment, a snapshot of the datum may be created in response to creation of a snapshot (i.e., a copy) of the region 228 (i.e., the region snapshot) containing the datum. Illustratively, creation of the region snapshot includes incrementing a version number of the region, i.e., region version number 352. Upon changing, e.g. updating in-place, the datum following creation of the region snapshot, the version number of the guard may not match the incremented version number of the region. The user-level library 225 may observe the mismatch, e.g., within the context of the STM commit operation and, in response, create a new instance of the guard using, e.g., a copy-on-write operation. The new instance of the guard includes the incremented (new) version number, e.g., from the region version number, and the changed datum. The library then updates the handle pointer to reference the new instance of the guard as well as its changed datum and new version number. Notably, the previous (old) version of the datum and its previous (old) version number are retained within a set of historical values for the datum organized as a per datum skip list of the guard keyed by version number. Accordingly, the guard provides a basis for versioning of the datum.

Illustratively, a skip-list of one or more datum versions 422*a-c* (i.e., keyed by version number 424*a-c*) is associated with the guard 420. Each datum version is associated with a snapshot via a corresponding version number (i.e., the version number 424 of the guard 420 matches the snapshot version number 364 of the snapshot). Accordingly, for example, the datum 422*b* may be retrieved from the skip-list using as a key a particular snapshot version number corresponding to datum 422*b*, i.e., the datum 422*b* is within the snapshot having the particular snapshot version number as its version number. Notably, the version number 424*a* (i.e., most recent version number for the datum) is initialized with the value from the region version 352 when the datum is created and may not correspond to any snapshot version number.

Figure 5A:
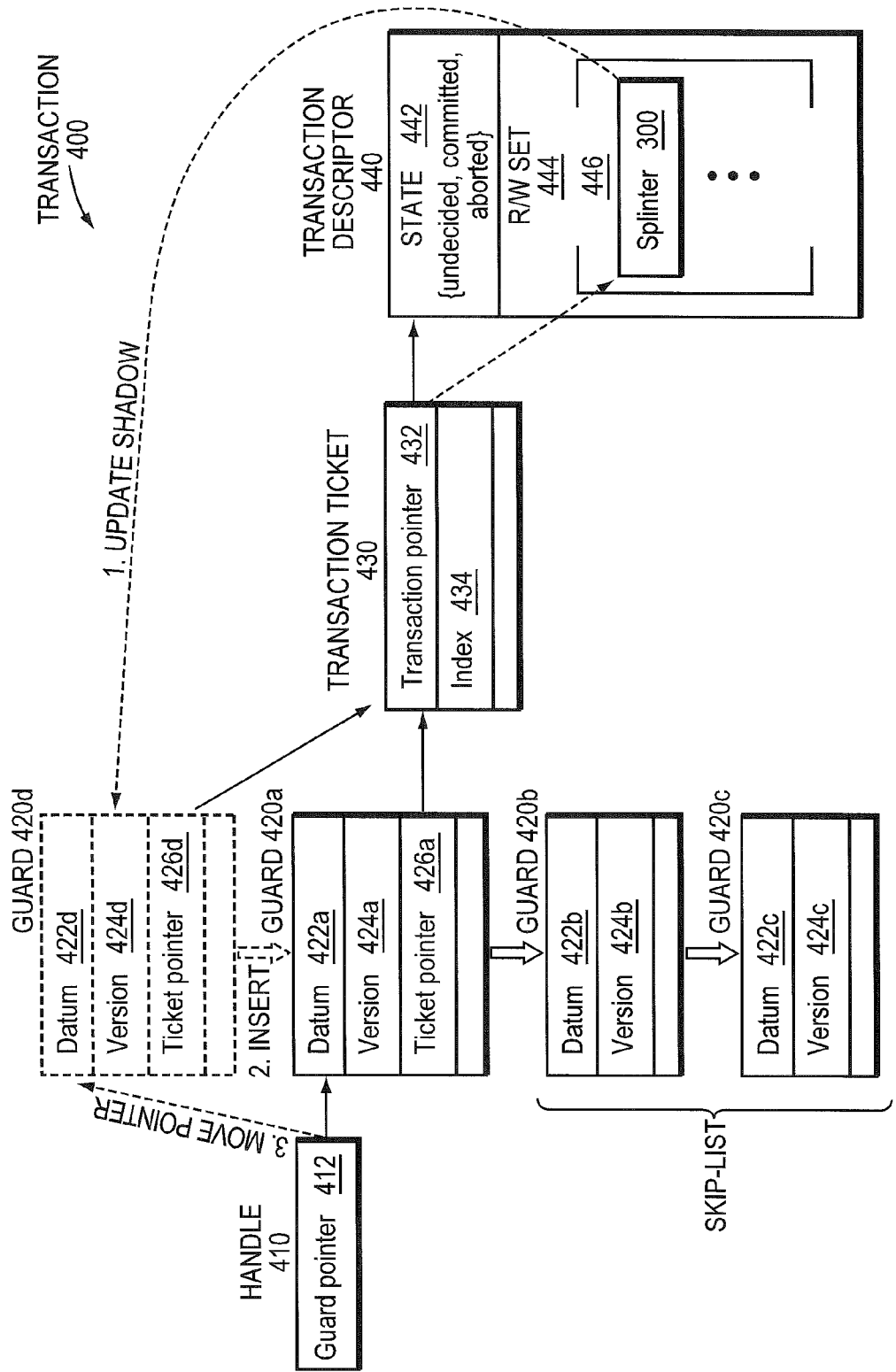
FIG. 5a is a block diagram of a datum transaction update for snapshot.
Figure 5B:
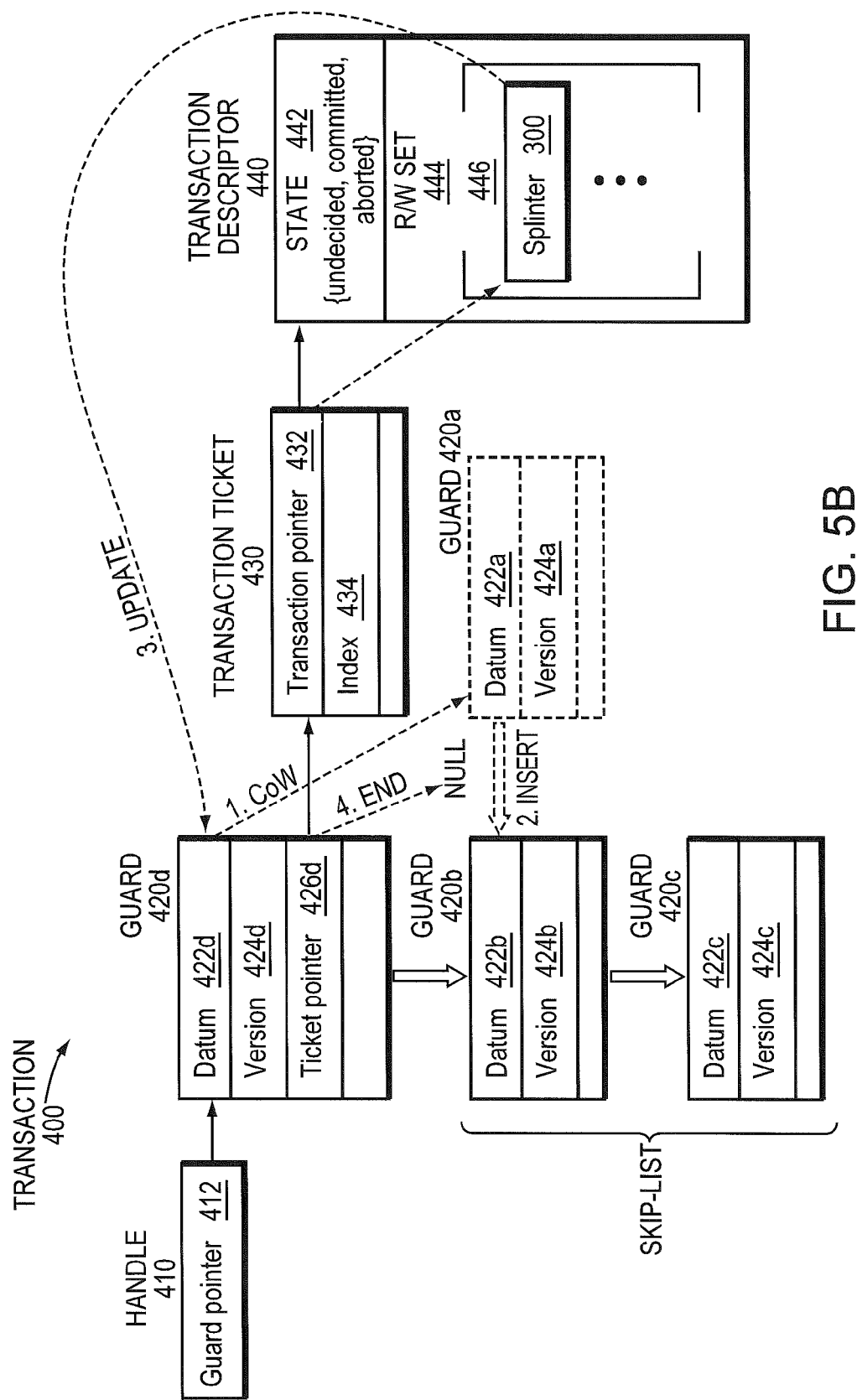
FIG. 5b is a block diagram of a datum transaction update for snapshot.

FIGS. 5*a* and 5*b* each depict a block diagram for an embodiment of a transaction snapshot update. Illustratively, creation of the region snapshot includes incrementing a region version number 352 in the region management data structure 350 associated with the region 228. Upon changing the datum (e.g., an STM commit operation) following creation of the region snapshot, the version number 424*a* of the guard 420*a* may not match the incremented region version number 352. The user-level library 225 may observe the mismatch, e.g., within the context of the STM commit operation and, in response, create a new instance of the guard 420*d* using, e.g., a shadow copy (FIG. 5*a*) for changed datum in the transaction descriptor 440 or a copy-on-write operation (FIG. 5*b*) for old datum in the guard 420*a*. For the embodiment illustrated in FIG. 5*a*, the new instance of the guard 420*d* includes the incremented (new) version number 424*d*, e.g., from the region snapshot (snapshot version number 364), and the changed datum 422*d*. The user-level library 225 then updates the guard pointer 412 to reference the new instance of the guard 420*d* as well as its changed datum and new version number 424*d*. Notably, the previous (old) version of the datum 422*a* and its old version number 424*a* are retained within a set of historical values for the datum organized as a per datum skip list of the guard, i.e., the guard instance 420*d* is inserted into the per datum skip list keyed to the version number. Accordingly, the guard provides a basis for versioning of the datum. In other embodiments the set of historical datum values may be organized as a linked-list, a balanced tree, or ordered collection.

For the embodiment illustrated in FIG. 5*b*, the old instance of the guard 420*a* is a copy-on-write of the new guard 420*d* and includes old version number 424*a* and the old datum 422*a*. The copy-on-write instance of the guard 420*d* including a new version of datum 422*d* and new version 424*d* is then inserted in a per datum skip list of the guard to maintain a set of historical values for the datum. Next, the user-level library 225 processes the r/w set to update (e.g., via the STM commit operation) the datum in-place, i.e., changes datum 422*d*, and new version number 424*d* in-place to the value of the incremented snapshot version number 364 of the region snapshot. Once the above steps complete for all operations in the r/w set 444 of the transaction 400, the ticket pointer 426*a* is updated to the NULL pointer.

Logging

Figure 6:
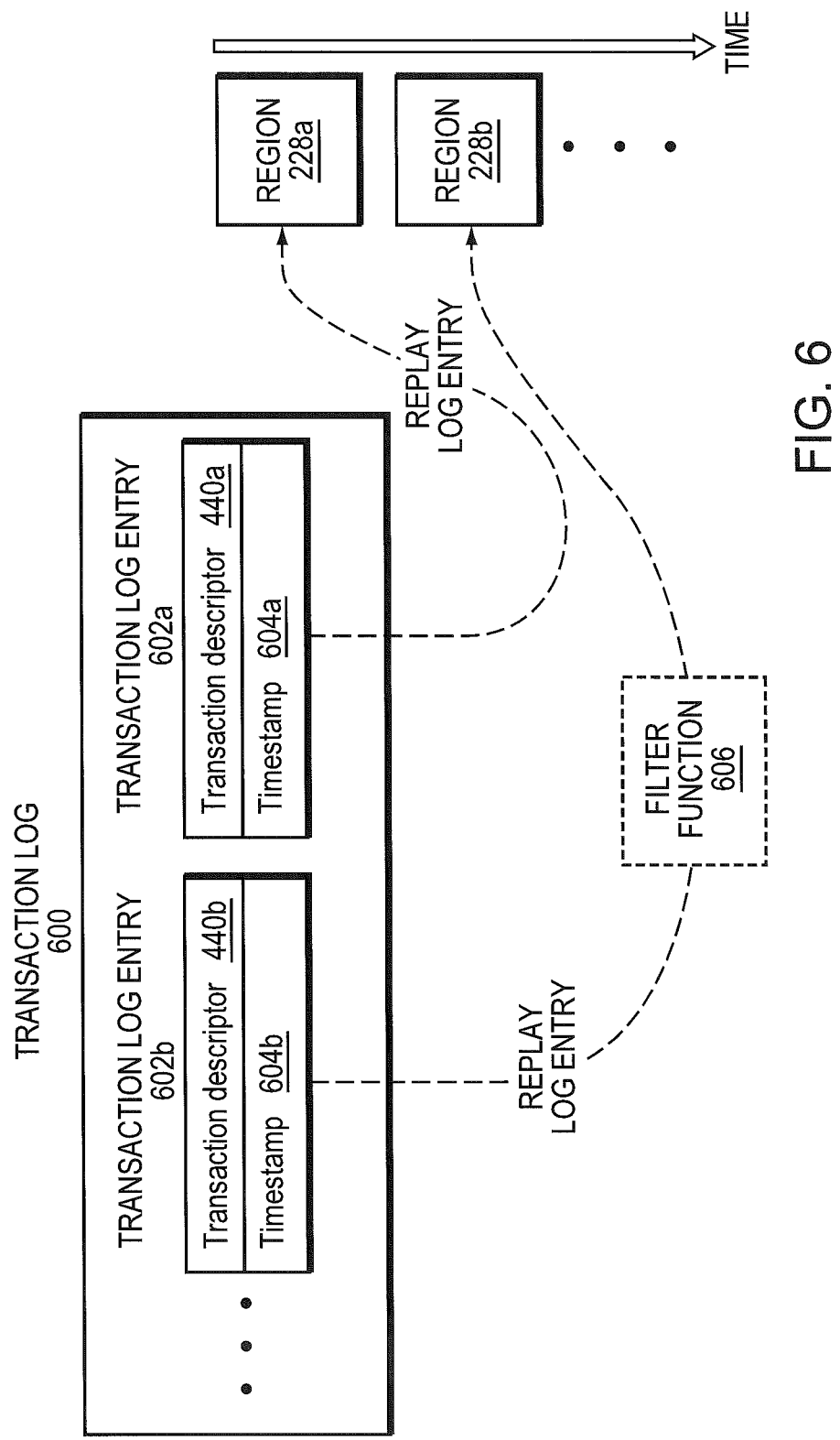
FIG. 6 is a block diagram of a transaction log.

FIG. 6 is a block diagram of a transaction descriptor log 600. Illustratively, the transaction descriptors 440 may be logged (e.g., for committed transactions) in the transaction log 600 such that the associated region's 228*a-b* evolution through time (e.g., at each STM commit operation) is described. In an embodiment, the transaction log 500 may be stored in the region 228. The transaction log 600 includes a plurality of log entries 602*a-b* each having a transaction descriptor 440 and a timestamp 604 for the associated transaction 400 at the time of commitment, i.e., processing of the r/w set for the transaction. Accordingly, the transaction log entries 602*a-b* may be played forward or backward by applying the r/w set operations for the respective logged transaction descriptors 440*a-b*. Notably, the log 600 may be independent of snapshots and versions.

In a further embodiment, the log 600 may be configured to apply a filter function 606, e.g., a user routine in the application 222, to each played step, i.e. each applied log entry 602, of the log 600 within the region 228.

While there have been shown and described illustrative embodiments for snapshot and versioning of transactional storage class memory, it is to be understood that various other adaptations and modifications may be made within the spirit and scope of the embodiments herein. For example, embodiments have been shown and described herein with relation to specific programming language semantics, inter alia, C++ data structure representations, inheritance, indirection, type casting, operator overloading, and functions. However, the embodiments in their broader sense are not so limited, and may, in fact, allow any programming language capable of implementing STM for arbitrary user data structures.

The foregoing description has been directed to specific embodiments. It will be apparent, however, that other variations and modifications may be made to the described embodiments, with the attainment of some or all of their advantages. For instance, it is expressly contemplated that storage class memory as described herein may be selected from, among others: SONOS Flash, Nanocrystal Flash, Feroelectric RAM (FeRAM), Magnetic RAM (MRAM), Phase-Change RAM (PCRAM), Resistive RAM (RRAM), Solid Electrolyte RAM, and Polymer/Organic RAM.

It is equally contemplated that the components and/or elements, e.g., the procedures, processes and/or modules, described herein can be implemented as software encoded on a tangible (non-transitory) computer-readable medium (e.g., disks and/or CDs) having program instructions executing on a computer, hardware, firmware, or a combination thereof.

Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   organizing a persistent memory on a host computer as a software transactional memory (STM) that provides atomicity, consistency, isolation and durability (ACID) properties;
   creating a region within a portion of the persistent memory, the region including an initial region version number;
   creating a datum in the region, the datum associated with the initial region version number;
   maintaining a set of historical values of the datum in the persistent memory, wherein the set of historical values is associated with a set of datum version numbers; and
   in response to creating a snapshot of the region, creating a snapshot of the datum, the region snapshot associated with an incremented region version number, wherein the snapshot of the datum is included in the set of historical values and is associated with a first datum version number different from the incremented region version number associated with the region snapshot.

2. The method of claim 1 wherein creating the snapshot of the region further comprises:
   changing the initial region version number;
   associating the datum with a second datum version number set to the changed initial region version number; and
   setting the first datum version number to the initial region version number.

3. The method of claim 2 wherein creating the snapshot of the region further comprises:
   creating an entry in a snapshot directory in the persistent memory, the entry having a snapshot identifier and the incremented region version number.

4. The method of claim 2 wherein the snapshot of the datum is included in a skip-list associated with the datum.

5. The method of claim 2 wherein the snapshot of the datum is a copy-on-write of the datum.

6. The method of claim 5 further comprising:
   providing a handle associated with the datum in response to creating the datum in the region, the handle including a pointer to the datum; and
   updating the pointer to reference the snapshot of the datum.

7. The method claim 2 further comprising:
   using the initial region version number as a key to retrieve the snapshot of the datum.

8. The method of claim 2 further comprising:
   adding a first write operation to a transaction for the datum, the first write operation including a base address locating the datum in the persistent memory, a length and a string of bytes that describe a first modification to the datum; and
   creating the region snapshot in response to an STM commit operation using the transaction.

9. The method of claim 8, wherein creating the region snapshot in response to the STM commit operation further comprises:
   processing the first write operation added to the transaction such that the datum is updated; and
   completing the STM commit operation.

10. The method of claim 8, further comprising:
    adding a second write operation to the transaction for the datum, wherein the second write operation applies a second modification to the datum; and
    in response to the first and second write operations modifying the datum, aborting the STM commit operation such that the first and second write operations remain unapplied.

11. A system comprising:
    a storage class memory coupled to a processor; and
    a library executing on the processor to organize the storage class memory as a software transaction memory (STM) that provides atomicity, consistency, isolation and durability (ACID) properties, the library when executed by the processor configured to create a region within a portion of the storage class memory, the region including a region version number having an initial value,
    the library further configured to create a datum in the region, the datum included in a guard data structure, the guard data structure including a first datum version number having a value of the region version number,
    the library further configured to maintain a set of historical values of the guard data structure in the storage class memory, wherein the set of historical values is associated with a set of datum version numbers, and
    the library further configured to create a snapshot of the datum in response to creating a region snapshot, the region snapshot associated with an incremented region version number, the snapshot of the datum including a copy of the guard data structure, wherein the copy of the guard data structure is included in the set of historical values and includes a second datum version number having a value different from the incremented region version number associated with the region snapshot.

12. The system of claim 11 wherein the library is further configured to:
    change the value of the region version number, wherein the second datum version number associated with the copy of the guard data structure remains unchanged; and update the first datum version number of the guard data structure to the changed value of the region version number.

13. The system of claim 12 wherein the library is further configured to:
create an entry in a snapshot directory in the storage class memory, the entry SI having a snapshot identifier and the incremented region version number.

14. The system of claim 12 wherein the copy of the guard data structure is included in a skip-list associated with the guard data structure.

15. The system of claim 12 wherein the copy of the guard data structure is a copy-on-write of the guard data structure.

16. The system of claim 12 wherein the library is further configured to:
use the initial value of the region version number as a key to retrieve the datum in the copy of the guard data structure.

17. The system of claim 12 wherein the library is further configured to:
add a first write operation to a transaction for the datum of the guard data structure, the first write operation including a base address locating the datum of guard data structure in the storage class memory, a length and a string of bytes that describe a modification to the datum of the guard data structure; and
create the region snapshot in response to an STM commit operation using the transaction.

18. The system of claim 17 wherein the library is further configured to:
process the first write operation added to the transaction such that the described modification to the datum of the guard data structure is applied.

19. The system of claim 17 wherein the STM commit operation is aborted in response to a second write operation added to the transaction that overlaps the described modification of the first write operation.

20. A system comprising:
a storage class memory coupled to a processor; and
a library executing on the processor to organize the storage class memory as a software transaction memory (STM) that provides atomicity, consistency, isolation and durability (ACID) properties, the library when executed by the processor configured to create a region within a portion of the storage class memory, the region including a region version number having an initial value,
the library further configured to create a datum in the region, the datum included in a guard data structure, the guard data structure including a datum version number having the initial value of the region version number,
the library further configured to maintain a set of historical values of the datum in the storage class memory, wherein each historical value is associated with a different version number,
the library further configured to add a write operation to a transaction for the datum of the guard data structure, the write operation including a base address locating the datum in the storage class memory, a length and a string of bytes that describe a change to the datum,
the library further configured to log the transaction, and
the library further configured to replay the logged transaction by processing the write operation added to the transaction.

* * * * *